United States Patent
Sundermeyer et al.

(10) Patent No.: US 7,921,360 B1
(45) Date of Patent: Apr. 5, 2011

(54) CONTENT-RESTRICTED EDITING

(75) Inventors: Kenneth P. Sundermeyer, Belmont, CA (US); Sho Kuwamoto, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1348 days.

(21) Appl. No.: 10/690,980

(22) Filed: Oct. 21, 2003

(51) Int. Cl.
*G06F 17/00* (2006.01)
(52) U.S. Cl. ....................................................... 715/255
(58) Field of Classification Search .................. 715/530, 715/255
See application file for complete search history.

(56) References Cited

U.S. PATENT DOCUMENTS

| | | | |
|---|---|---|---|
| 5,572,643 A | 11/1996 | Judson | |
| 5,752,643 A * | 5/1998 | MacVicar et al. | 227/10 |
| 5,778,389 A | 7/1998 | Pruett et al. | |
| 5,892,908 A | 4/1999 | Hughes et al. | |
| 6,012,071 A | 1/2000 | Krishna et al. | |
| 6,061,692 A | 5/2000 | Thomas et al. | |
| 6,061,697 A * | 5/2000 | Nakao | 715/513 |
| 6,078,929 A | 6/2000 | Rao | |
| 6,145,003 A | 11/2000 | Sanu et al. | |
| 6,148,289 A | 11/2000 | Virdy | |
| 6,167,453 A | 12/2000 | Becker et al. | |
| 6,385,606 B2 | 5/2002 | Inohara et al. | |
| 6,393,420 B1 | 5/2002 | Peters | |
| 6,516,337 B1 | 2/2003 | Tripp et al. | |
| 6,519,626 B1 | 2/2003 | Soderberg et al. | |
| 6,626,957 B1 | 9/2003 | Lippert et al. | |
| 6,629,127 B1 | 9/2003 | Deen et al. | |
| 6,823,478 B1 | 11/2004 | Prologo et al. | |
| 6,944,658 B1 | 9/2005 | Schneider | |
| 6,959,288 B1 | 10/2005 | Medina et al. | |
| 6,985,936 B2 | 1/2006 | Agarwalla et al. | |
| 6,990,629 B1 | 1/2006 | Heaney et al. | |
| 7,032,000 B2 | 4/2006 | Tripp | |
| 7,062,506 B2 | 6/2006 | Taylor et al. | |
| 7,086,050 B2 | 8/2006 | Barton et al. | |
| 7,117,504 B2 | 10/2006 | Smith et al. | |
| 7,213,201 B2 | 5/2007 | Brown et al. | |
| 7,263,534 B1 | 8/2007 | Margulis | |
| 7,269,664 B2 | 9/2007 | Hutsch et al. | |
| 7,281,060 B2 | 10/2007 | Hofmann et al. | |
| 7,287,227 B2 | 10/2007 | Ries et al. | |
| 7,448,032 B2 | 11/2008 | Bourbonnais | |
| 7,457,805 B2 | 11/2008 | Deen et al. | |
| 7,480,910 B1 | 1/2009 | Kuwamoto et al. | |
| 7,809,858 B1 | 10/2010 | Brown | |

(Continued)

OTHER PUBLICATIONS

Fraternali, P., "Tools and Approaches for Developing Data-Intensive Web Applications: A Survey", ACM Computing Surveys, vol. 31, Issue 3, Sep. 1999, p. 227-263.*

(Continued)

*Primary Examiner* — Amelia Rutledge
(74) *Attorney, Agent, or Firm* — Kilpatrick Townsend & Stockton LLP

(57) ABSTRACT

A system and method are disclosed to restrict editing in a tag-delimited, multi-formatted document comprising parsing the multi-formatted document, identifying a plurality of tags responsive to the parsing, generating a revised document based on the multi-formatted document, inserting one or more restriction tags into the revised document delimiting non-editable content defined by one or more of the plurality of tags, and restricting edit functions of a page editor responsive to the page editor reading the one or more restriction tags.

23 Claims, 4 Drawing Sheets

U.S. PATENT DOCUMENTS

| | | | |
|---|---|---|---|
| 2001/0002470 | A1 | 5/2001 | Inohara et al. |
| 2002/0023112 | A1 | 2/2002 | Avital |
| 2003/0023632 | A1 | 1/2003 | Ries et al. |
| 2003/0061278 | A1 | 3/2003 | Agarwalla et al. |
| 2003/0167317 | A1 | 9/2003 | Deen et al. |
| 2003/0220924 | A1 | 11/2003 | Bourbonnais |
| 2004/0177321 | A1* | 9/2004 | Brown et al. ............ 715/513 |

OTHER PUBLICATIONS

Dreamweaver TechNote16416, "How to make an inherited editable region uneditable," Jul. 6, 2002, p. 1-4.*

Macromedia Dreamweaver MX: Training from the Source, published Jul. 23, 2002, Safari Tech Books Online version, http://proquest.safaribooksonline.com, p. 1-39.*

U.S. Appl. No. 10/690,214, filed Oct. 21, 2003, M. J. Sundermeyer, et al.

Berners-Lee, et al., "RFC 1738—Uniform Resource Locations (URL)"—Dec. 1994, p. 1-23.

Altova Inc. & Altova GmbH, "XML Spy 4.0 Manual," copyright 1998-2001, Chapter 3, consisting of pp. 91-286.

GlobalScape, "CuteFTP Pro Technical Overview," White Paper, May 22, 2001, Published on the Internet at least by Aug. 14, 2002 from: http://web.archive.org/web/20020814133509/www.globalscape.com/support/manuals.shtml, pp. i-ii and 1-17.

Kim, L., "XML Spy, XML Integrated Development Environments, Accelerating XML Application Development in the Enterprise," Altova Inc. & Altova GmbH 2002, published on the Internet as of Aug. 21, 2002, from link to: http://web.archive.org/web/20020802160016/www.www.xmlspy.com/resources_wp.html, pp. 1-20.

GlobalScape, "CuteFTP Pro, User'sGuide," published on the Internet as of Aug. 14, 2002, from link to: http://web.archive.org/web/20020814133509/www.globalscape.com/support/manuals.shtml, downloaded pp. 1-108.

XIASOFT, "Streamlining content creation, retrieval, and publishing on the Web, Using TEXTML Server and XML Spy 4 Suite in an integrated, Web publishing environment," White Paper, Jul. 2002, pp. 1-16.

* cited by examiner

*FIG. 1*

```
<html>
<head>
<title>Contribute Example</title>
<meta http-equiv="Content-Type" content="text/html; charset=iso-8859-1">
</head>

<body>

<p>The bage begins with a paragraph tag that signifies that the text within those      ⁄—100
    tags is part of a paragraph. While the formatting is of a paragraph, the text
    within plain paragraph tags is usually considered editable.</p>

<p><b>Bold text may also be represented within a paragraph tag, but it also is    ⁄—101
    formatted by its own tag.</b></p>

<script> May include script written in CFML, ASP, JSP, PHP, or the like.</script>   ⁄—102

<table width="701" height="180" border="1" bordercolor="#0000FF" bgcolor="#CCCCCC">
        104     105     106     107         108        ╲103
    <tr>  ⁄—109
        <td width="172" rowspan="2"><div align="center"><b><font color="#0000FF"
size="+2" face="Georgia, Times New Roman, Times, serif">Table</font></b></div></td>
        <td width="164"><img src="logo.jpg" width="303" height="48"></td>
        <td width="100">Image files can typically be protected from editing.</td>    110
        <td width="124" rowspan="3">Table</td>
        <td width="107" rowspan="3">Text</td>
    </tr>

<tr>  ⁄—111
        <td colspan="2" rowspan="3" valign="middle">Table text can be entered on a
            per cell basis. Therefore, the text within the cell may be edited in certain    112
            circumstances. However, if there are heading cells that the designer does
            not want changed, those may also be protected.</td>
    </tr>

<tr>  ⁄—113
        <td>Table text.</td> ╲114
    </tr>

<tr>  ⁄—115
        <td>Table text</td>            116
        <td colspan="2">Table Text</td>
    </tr>

</table>
</body>
</html>
```

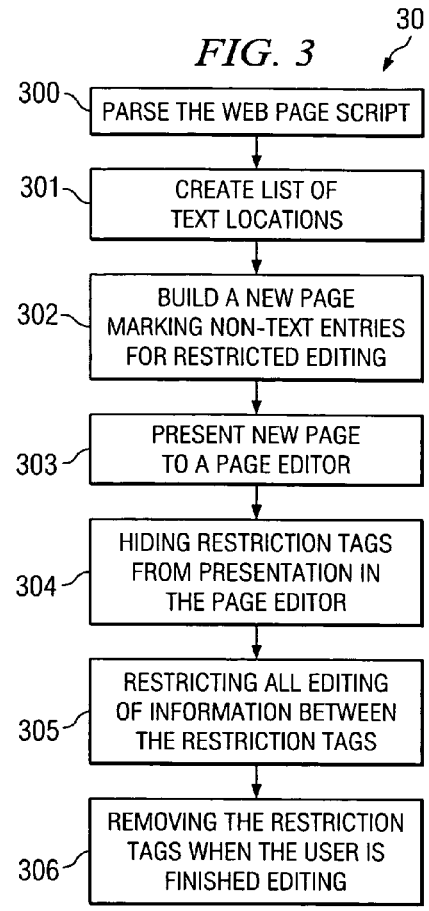
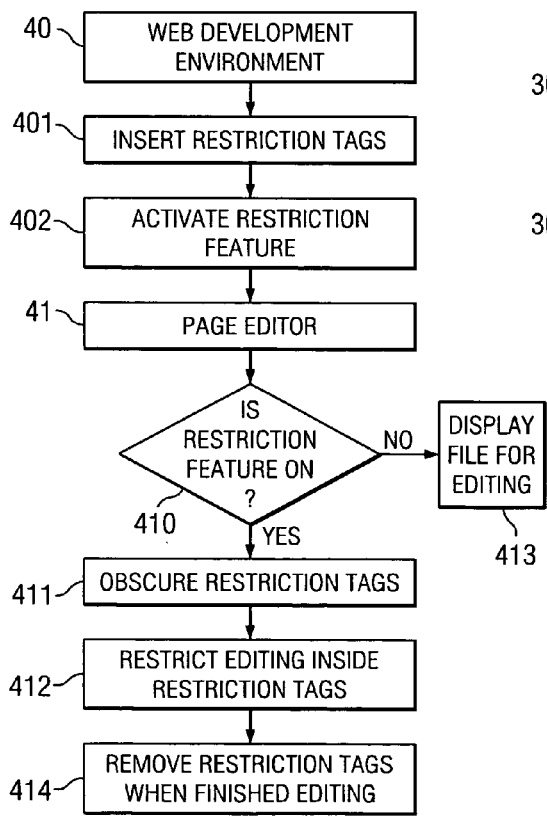

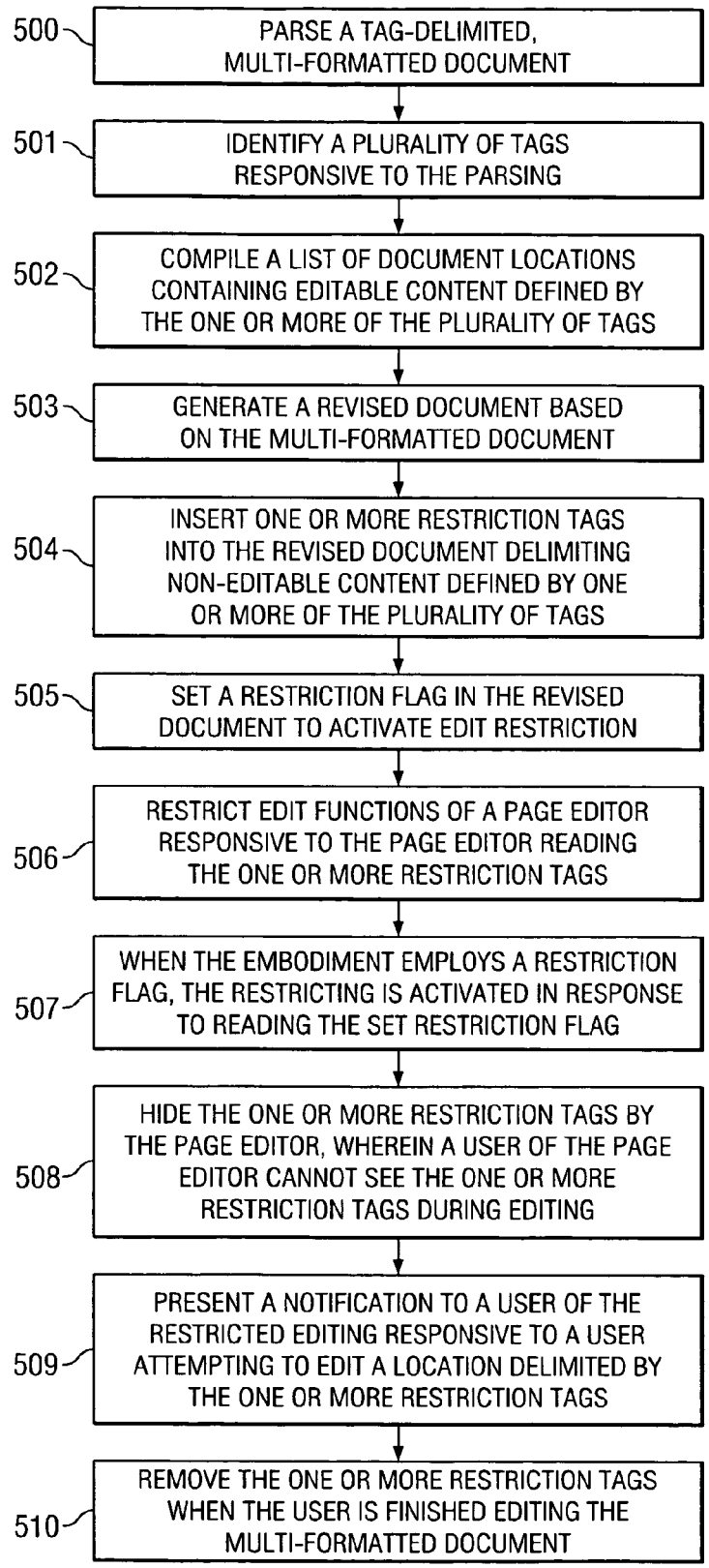

CONTENT-RESTRICTED EDITING

CROSS-REFERENCE TO RELATED APPLICATIONS

The present application is related to concurrently-filed, commonly-owned U.S. patent application Ser. No. 10/690,214, entitled, "WEB SITE MANAGEMENT LIFECYCLE," the disclosure of which is incorporated herein.

TECHNICAL FIELD

The present invention relates, in general, to electronic document editing, and, more specifically, to content-restricted editing.

BACKGROUND OF THE INVENTION

Information presentation has taken on various new forms in the information age. Visual presentation through television, print media, and the Internet takes raw information and packages it into, not simply plain text, but a complete multimedia experience by adding visual elements, including bold, colors, font-size, placement formatting, images, animations, video, and the like. Each of these formatting elements are created in order to generate a favorable user interaction with the information being presented. For example, advertising is much more effective using color, images, bold text, sound, and even animations or videos, than printing plain text. A great deal of thought and design work, including examining the psychology of certain colors, shapes, and the like, go into the design of such information presentations. These multi-formatted documents contain the visual as well as the textual information making the entire presentation.

Multi-formatted presentations are typically created by two separated segments of designers: formatting designers, who deal with the technical details of how to present the information; and subject matter exerts (SMEs), who deal with compiling and wording the textual part of the information. Formatting designers are not typically experts in a particular subject matter, while SMEs are also typically not experts in the technical aspects of visual presentation. A great deal of time, and cost is expended on both the formatting designers and the SMEs in creating a single, multi-formatted presentation. However, in typically arrangements, when only small changes to the textual information is necessary, both formatting designers and SMEs are usually needed to effect those small changes. The cost, therefore, is relatively high, compared to the quantity of the changes being made.

An example area in which this problem exists is in the design and maintenance of Web sites. Companies typically use the World Wide Web to disseminate information both internally, to employees and contractors, and externally, to customers and business partners. This information is usually generated by SMEs, who are typically people with expertise in the information domain, but who are not usually technically skilled. In order to publish this information to the Web, or edit the existing information already on a company Internet or Intranet Web site, SMEs typically work with technically skilled Web developers, who generally combine Web coding or computer programming skills and graphics design skills. Skilled Web developers are an expensive resource. Moreover, Web developers may divide the coding and graphics arts expertise into multiple people. In a commercial Web site, information may change often to supply Web viewers the most, up to date information. However, even in the smallest changes, both the Web designer and the SME are often needed to effect the change. Furthermore, because Web developers may divide the coding and graphic arts expertise, certain technical components of the Web site may be have changes pending even though the remaining technical components will not change.

Web sites generally comprise a Web server, that serves the visual and data content to the user's browser many times in a format, such as hypertext markup language (HTML), and a file transfer server, that provides read and write-access to the files that make up the visual and data content of the Web sites. While Web servers and file transfer servers are conceptualized as separate and independent machines, Web servers and file transfer servers are typically only software applications, often times running on the same computer. The underlying Web files are usually stored in memory or storage accessible by the computer, and the Web server and file transfer server applications interact with those files in different ways. Web servers typically allow only read-access to the Web files, compared to the read/write-access allowed by the file transfer servers. Because the file transfer server allows read/write-access to Web files, general users are not typically given access to the file transfer server because changing files through the file transfer server will change how the Web pages are served through the Web server to the accessing browsers. Instead, file transfer server access is generally limited to Web developers or those who have some authority over the Web content. File transfer servers typically run a specific transfer protocol, such as file transfer protocol (FTP), secure FTP (SFTP), or the like. Additionally, the file transfer server may be set up on a local area network (LAN), or the like.

Web development environments and development tools exist to assist the developers both retrieve and edit the underlying files that make up the Web pages. However, it is generally not considered effective to allow the Web designers to code in the textual changes, because the technology underlying a web page typically exceeds their expertise. Moreover, SMEs are also not usually considered for accessing the underlying Web files to update the text, because they are typically non-technical. Therefore, the SME may unwittingly destroy or change some or all of the formatting for which the Web designer spent countless hours designing and implementing.

Solutions to this problem have been attempted, by creating a Web site that reads from a database. SMEs may then have access to the database to update any textual information contained therein, while the formatting of the Web page is preserved. However, this solution generally requires that the Web site be built from scratch using this paradigm, and it commonly limits the SME to entering raw text in a form. Therefore, it is not feasible for the millions of existing Web sites and pages that are not already set up for this means of editing. Absent such customized Web designs, companies are faced with either hiring experts to make even simple changes, not allowing SMEs to edit at all, or giving them access to the entire Web page, which risks the design and integrity of the site.

BRIEF SUMMARY OF THE INVENTION

Preserving design or formatting elements in a multi-formatted document allows SMEs the ability to access the document to edit the content without the worry of inadvertently destroying or changing the design/format. With the feature, designers maintain the design, and SMEs maintain the content. Therefore, when only a small amount of content is to be changed, the SME or other non-technical personnel can make the updates without the designer.

Representative embodiments of the present invention leverage the meta information provided in tag-delimited documents, such as Web pages, database pages, word processing documents, and the like, to make determinations about the content of these documents. A sophisticated parser parses through the tag-delimited document analyzing the tags and text and identifying the sections that should be editable by the SME. Once the parse list is finished, a translator generates a substitute document including all of the tags and content of the original document, and also inserts new restriction tags around the content either that the developer does not wish to have. After the restriction tags are inserted, the new, substitute document may be ready to be viewed in appropriate editor that can interpret the restrictions. The restriction tags would be invisible to the normal viewer applications, thus, obviating a need to change any such viewer technology.

When the content of the document is to be edited, a SME would retrieve the substitute document and open it in a page editor. The page editor would be specially designed to recognize the restriction tags within the document. In response to those restriction tags, the page editor would selectively deactivate all of the editing features for the matter delimited by those restriction tags. Therefore, the SME would be able to edit the content of the document, but not the design or formatting of the document. The SME would not be able to select or edit the protected design and formatting elements of the document.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is a page view of a typical HTML file representing a Web page;

FIG. 3 is a flowchart illustrating steps executed in implementing one embodiment of the present invention;

FIG. 4 is a process chart illustrating another embodiment of the present invention; and FIG. 5 is a flowchart illustrating steps executed in implementing another embodiment of the present invention.

DETAILED DESCRIPTION OF THE INVENTION

Figure 2:
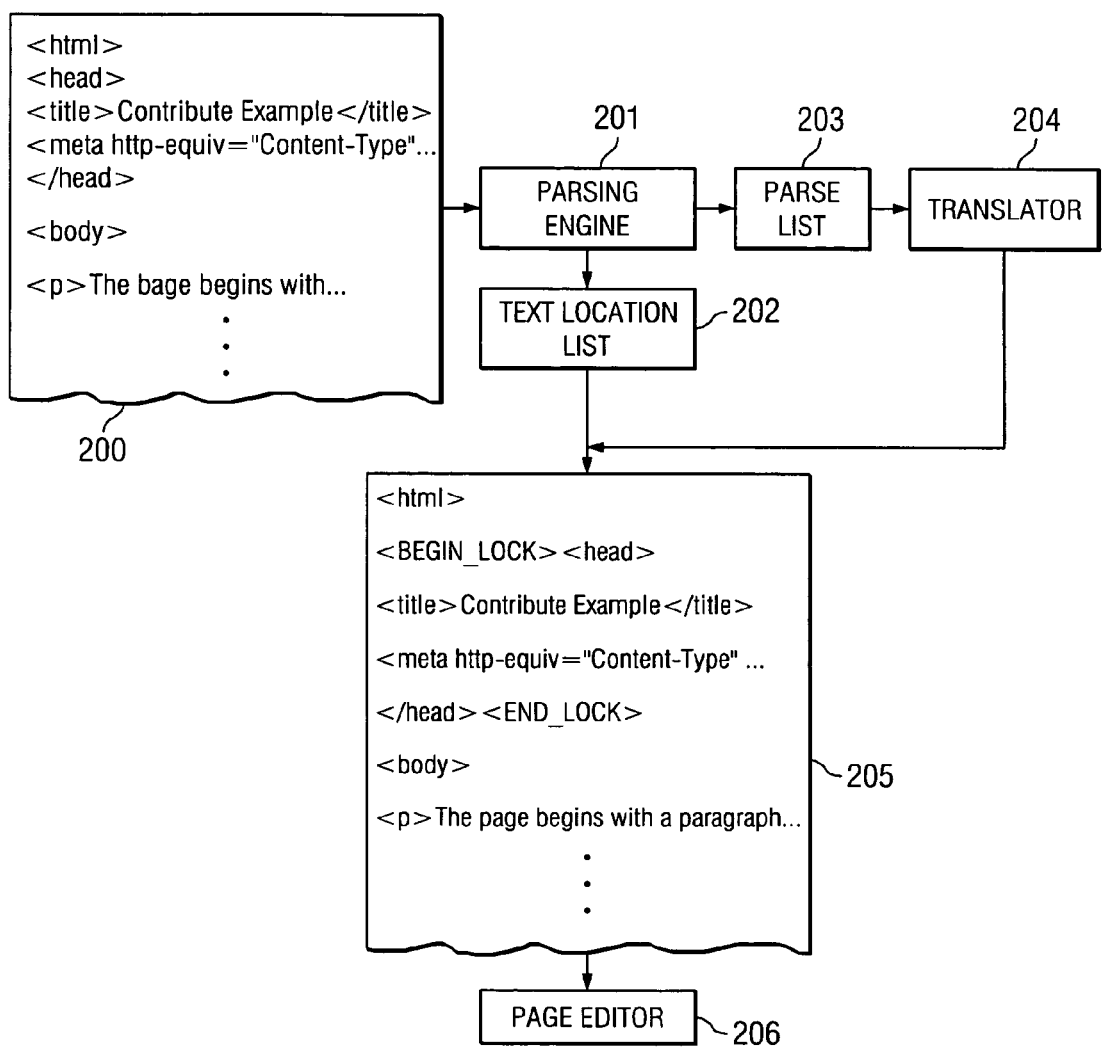
FIG. 2 is a block diagram illustrating one embodiment of the present invention.

The design of most multi-formatted presentations includes some form of content tagging or identification to categorize the different portions and types of the content. In such content-delimited presentations, new delimiters may be used to identify content that is too dangerous to allow non-technical users to edit. One embodiment of the present invention relates to the development and maintenance of Web sites and Web pages. The examples described hereafter each deal with this Web development-embodiment of the present invention. However, it should be noted that the present invention is, in no way, limited solely to the design and maintenance of Web sites/pages.

Web site maintenance is typically a time consuming and costly process. Even where small changes to the content of Web pages are made, development professionals typically are required to implement the changes due to their specific knowledge of the Web server/FTP server systems and, in the interest of preserving the format and design of the Web sites that they have spent considerable effort designing and implementing. A new technology developed by MACROMEDIA, INC., and described in concurrently-filed, commonly-owned patent application, entitled, "WEB SITE MANAGEMENT LIFECYCLE," allows non-technical users to browse to a particular Web site or Web page in which the content is to be edited/deleted/added, click on a button to edit that Web page, after which the system seamlessly presents the editable file in the same visual window to the user who may then edit the Web file in the same screen. After the user finishes editing the page, he or she may then click on a publish button, after which the system seamlessly stores the underlying, now-edited, Web file back into the storing computer's memory or accessible storage media through the FTP server along with all of the necessary dependent files. The system also ensures that the Web file, and, if necessary, dependent files are stored in the appropriate places on the storing computer system. This process generally occurs without the necessity that the user know the correct FTP server file transfer root directory name or the relationship between the Web server and the FTP server file systems. One problem in implementing this Web site management lifecycle is the protection of the formatting design of the particular Web site or Web page from inadvertent damage due to a mistake made by a non-technical user. The Web design-related embodiment of the present invention addresses this problem.

Web pages are typically made up of HTML files, which include mark-up tags that define the presentation and formatting of the data on the page. HTML is a "presentation language." Therefore, certain tags identify bold text, italicized text, tables, colors, images, and other visual formatting elements, as well as identifying code segments embedded within the document. Web designers spend considerable time designing the formatting of the text and writing the code that provides some kind of action or dynamic feature of the Web page. Dynamic features include pulling information from a database and assembling a Web page on-the-fly using that information.

HTML is only one example of a language that may be used with the various embodiments of the present invention. Other languages may have ways of delimiting material within the code or document to be able to segregate one part of the document from another. The present invention is not limited in use with only tag-based meta languages, such as HTML.

FIG. 1 is a page view of typical HTML file 200 representing a Web page. HTML file 200 includes many different types of tags that represent different format features in HTML. Line 100 includes a paragraph tag, <p>, that signifies that the text after that tag is plain text when no other formatting tags are present. Line 101 includes a bold text tag, <b>, that signifies that the text after that tag will be displayed as bold text. Line 102 includes a script tag, <script>, that signifies that the text after that tag will be script of some sort, such as MACROMEDIA, INC.'s COLDFUSION™ MARKUP LANGUAGE™ (CFML™), MICROSOFT CORPORATION's ACTIVE SERVER PAGES™ (ASP™), SUN MICROSYSTEM's JAVA™ SERVER PAGES™ (JSP™), PHP, and the like. Line 103 includes a table tag, <table>, that defines the beginning of an HTML table. HTML tables are a formatting or design element that controls the presentation of certain information. The table tag includes the definitions of several properties including width 104, height 105, border size 106, border color 107, and background color 108. These items each control some aspect of the design and presentation of the information. Lines 109, 111, 113, and 115 each include a table row tag, <tr>, that defines one of the table rows of the HTML table. Lines 112, 114, and 116 each include at least one table data tag, <td>, that defines a single cell of the table. The table data tag also includes properties that control the appearance of the data that will be displayed. However, the cell text itself typically includes text information.

FIG. 2 is a block diagram illustrating one embodiment of the present invention. In order to restrict editing on certain document elements, HTML document 200 is parsed by parsing engine 201. Parsing engine 201 is a complex, advanced parser much like the parser found in modern Web development applications, such as MACROMEDIA INC.'s DREAMWEAVER™. Parsing engine 201 is able to recognize each HTML tag and includes code that "understands" what each tag means. As parsing engine 201 parses HTML document 200, it produces location list 202 comprising locations in HTML document 200 of editable text. Parsing engine 201 also produces parse list 203, which includes enhanced information on each of the tags and make up of HTML document 200. Both parse list 203 and location list 202 are then passed to translator 204. Using the information from parse list 203 and location list 202, translator 204 generates revised HTML document 205.

Revised HTML document 205 not only includes the HTML tags of HTML document 200, but also includes restriction tags, inserted by translator 204, around each non-text-editable location of revised HTML document 205. For example, the link tag "href" is preceded by the restriction tag <BEGIN_LOCK>, and the link is ended by the end tag, <END_LOCK>. These tags are not part of the HTML standard, and are generally ignored by tools that render HTML, such as Web browsers. Translator 204 inserts these restriction tags around each non-text tag in revised HTML document 205. Revised HTML document 205 may then be stored for a Web site through the Web site's file transfer server. Browsers that request access to that Web page through a Web server will then be presented the Web page as defined by revised HTML document 205. Restriction tags may be configured to be ignored by Web servers and browsers as comment tags would be. Therefore, there is no need for modifying a Web browser for use with this embodiment of the present invention.

If the text of the Web page, corresponding to revised HTML document 205, needs to be updated, SMEs may edit revised HTML document 205 using page editor 206. As page editor reads revised HTML document 205, it recognizes the restriction tags and deactivates the editing features for those areas delimited by the restriction tags. As the SMEs highlight areas of text to edit, they may add, subtract, or change this text. However, if the SME attempts to highlight any area that is within the restriction tags, nothing happens. Page editor 206 may respond by taking no action, or may cause a pop-up window identifying to the user that the highlighted area cannot be edited, or other such indication to the user that he or she cannot edit the selection.

FIG. 3 is a flowchart illustrating steps executed in implementing one embodiment of the present invention. In step 300, a Web page HTML file is parsed. In step 301, the parser creates a list of actual text locations in the HTML file. A translator uses the parsed file and the list of text locations, in step 302, to build a new HTML file that includes restriction tags inserted around the parts of the HTML file that should not be edited by non-technical persons. At this point, the new file, including the restriction tags may be published for display by a Web server. The new restriction tags are not recognized by Web browsers, and, thus, do not display any differently than a typical HTML file.

If the text content of the HTML file needs to be edited at a later point, SMEs may download the file from the file transfer server for the Web site to a page editor configured to recognize the restriction tags, in step 303. On reading the restriction tags, the page editor may hide the restriction tags from being presented to the SME on the page editor in step 304. The restriction tags are hidden in step 304 to keep from confusing the SME with tags that are not as common among HTML documents. Moreover, the SME may also be able to delete these restriction tags, if viewable, which would defeat the protection they afford. While the SME is editing the HTML file in the page editor, editing features are turned off, in step 305, as to the parts of the HTML document that are marked by the restriction tags. However, those parts of the page that cannot be edited are still displayed in order to provide context for the editable parts of the page. Finally, in step 306, the restriction tags are removed when the user finishes editing.

FIG. 4 is a process chart illustrating another embodiment of the present invention. Web development environment 40 processes a Web file by inserting restriction tags around non-text information of the Web file in step 401. In step 402, Web development environment 40 activates the restriction feature in step 402, by adding an activation tag, setting a flag, a constant value, or some other indicator showing that the restriction feature is activated. When the Web file is later edited for content, page editor 41 is used. Page editor 41 includes special coding that recognizes the restriction tags and then selectively activates or deactivates editing features based on those codes. In step 410, page editor 41 determines whether the restriction feature has been activated. If so, page editor 41 obscures the restriction tags from the user's view in step 411, and restricts editing of the tagged non-text information, in step 412. Once the user finishes editing, the restriction tags are removed in step 414 before the document is saved to disk or saved out for presentations. If the restriction feature has not been activated, page editor 41 displays the HTML file without any special consequence in step 413.

Additional embodiments of the present invention may be applicable to document systems other than Web pages. FIG. 5 is a flowchart illustrating steps executed in implementing another embodiment of the present invention. In step 500, a tag-delimited, multi-formatted document is parsed by a parsing engine. In step 501, a plurality of tags are identified responsive to the parsing. In selected embodiments, the parsing engine may also compile a list of document locations containing editable content defined by the one or more of the plurality of tags in alternative step 502. In step 503, a translator generates a revised document based on the multi-formatted document. One or more restriction tags are inserted, in step 504, into the revised document delimiting non-editable content defined by one or more of the plurality of tags. In other selected embodiments, a restriction flag may be set in the revised document, in alternative step 505, to activate edit restriction. In step 506, edit functions of a page editor are restricted responsive to the page editor reading the one or more restriction tags. If alternative step 505 is executed in the additional embodiment, the restricting may be activated in response to reading the set restriction flag, in alternative step 507. In selected embodiments, the one or more restriction tags are hidden by the page editor in step 508, wherein a user of the page editor cannot see the one or more restriction tags during editing. A notification of the restricted editing is presented to a user, in step 509, responsive to the user attempting to edit a location delimited by the one or more restriction tags. In step 510, the one or more restriction tags are removed when the user is finished editing the multi-formatted document.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method to restrict editing in a tag-delimited, multi-formatted document comprising:
    parsing said multi-formatted document;
    identifying a plurality of tags responsive to said parsing;
    generating a revised document based on said multi-formatted document;
    inserting one or more restriction tags into said revised document delimiting non-editable content defined by one or more of said plurality of tags;
    restricting edit functions of a page editor editing said revised document, wherein said restricting is responsive to said page editor reading said one or more restriction tags; and
    stripping out said one or more restriction tags when said page editor writes said edited multi-formatted document for presentation.

2. The method of claim 1, further comprising:
    compiling a list of document locations containing editable content defined by said one or more of said plurality of tags.

3. The method of claim 1, further comprising:
    hiding said one or more restriction tags by said page editor, wherein a user of said page editor cannot see said one or more restriction tags during editing.

4. The method of claim 1, further comprising:
    setting a restriction flag in said revised document to activate edit restriction.

5. The method of claim 4 wherein said restricting step is activated in response to reading said set restriction flag.

6. The method of claim 1, further comprising:
    presenting a notification to a user of said restricted editing responsive to a user attempting to edit a location delimited by said one or more restriction tags.

7. A computer program product having a computer readable medium with computer program logic recorded thereon for restricting editing of a multi-formatted document, said computer program product comprising:
    code for parsing said multi-formatted document, wherein said each of said multiple formats is delimited in said multi-formatted document by one or more descriptive labels;
    code for analyzing said one or more descriptive labels;
    code for generating a modified document using content of said multi-formatted document;
    code for inserting a prohibition label in said modified document around each instance of non-editable content as defined by said one or more descriptive labels;
    code for prohibiting edit functions of a document editor editing said modified document, wherein said code for prohibiting is executed responsive to said prohibition labels; and
    code for removing said prohibition tags prior to saving said modified multi-formatted document for presentation.

8. The computer program product of claim 7 further comprising:
    code for assembling a list of editable content locations defined by said one or more descriptive labels.

9. The computer program product of claim 7 further comprising:
    code for obscuring said one or more restriction labels by said document editor.

10. The computer program product of claim 7 further comprising:
    code for setting a restriction feature flag in said modified document to activate restricted editing.

11. The computer program product of claim 10 wherein said code for prohibiting is activated in response to said set restriction feature flag.

12. The computer program product of claim 7 further comprising:
    code for notifying a user of said restricted editing responsive to a user attempting to edit a location delimited by said one or more descriptive labels.

13. A method to restrict editing of a Web document comprising:
    parsing said Web document;
    analyzing a plurality of markup tags within said Web document;
    generating a substitute Web document with content of said Web document;
    inserting one or more restriction markup tags in said substitute Web document demarcating non-editable content as defined by one or more of said plurality of markup tags;
    restricting edit functions of a Web editor editing said substitute Web document; and
    removing said one or more restriction markup tags responsive to a user completing edits,
    wherein said restricting is responsive to said one or more restriction markup tags.

14. The method of claim 13, further comprising:
    compiling a list of document locations containing editable content defined by said one or more of said plurality of tags.

15. The method of claim 13, further comprising:
    obscuring said one or more restriction markup tags by said Web editor.

16. The method of claim 13, further comprising:
    setting a flag in said substitute Web document indicating activation of said restricted editing.

17. The method of claim 16 wherein said restricting is activated in response to said flag.

18. The method of claim 13, further comprising:
notifying a user of said restricted editing responsive to said user attempting to access a location demarcated by said one or more restriction markup tags.

19. A system for preserving design elements of a Web page during content editing, said system comprising:
a Web development environment comprising:
a parsing engine for analyzing a plurality of Web page markup tags;
a list of restriction tags for insertion around said design elements, as defined by one or more of said plurality of Web page markup tags; and
a page editor comprising:
a plurality of deselectable editing functions, wherein said deselection is responsive to said restriction tags.

20. The system of claim 19 wherein a Web page is processed by said Web development environment to obtain said restriction tags.

21. The system of claim 19 wherein a subject matter expert operates said page editor to perform said content editing.

22. The system of claim 19 wherein said page editor further comprises: a cover object for obscuring said restriction tags from view in said page editor.

23. The system of claim 19 wherein said Web page includes a restriction switch, accessible by said Web development environment, for activating deselectability of said plurality of deselectable editing functions.

* * * * *